US006715110B1

(12) United States Patent
Beebe et al.

(10) Patent No.: US 6,715,110 B1
(45) Date of Patent: Mar. 30, 2004

(54) EXTERNAL DEBUG CARD SHARING A COMMUNICATION BUS

(75) Inventors: William Eldred Beebe, Round Rock, TX (US); Robert Allan Faust, Austin, TX (US); Joel Gerald Goodwin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/656,525

(22) Filed: Sep. 7, 2000

(51) Int. Cl.$^7$ .................................................. G06F 11/00
(52) U.S. Cl. ................................................. 714/45; 714/39
(58) Field of Search ................................. 714/39, 30, 31, 714/45, 727, 36; 710/18, 19

(56) References Cited

U.S. PATENT DOCUMENTS

| | | | | | |
|---|---|---|---|---|---|
| 4,420,819 | A | * | 12/1983 | Price et al. ..................... | 710/52 |
| 5,615,331 | A | * | 3/1997 | Toorians et al. ............... | 714/9 |
| 5,664,157 | A | * | 9/1997 | Takahira et al. .............. | 703/23 |
| 5,875,353 | A | * | 2/1999 | Whetsel ........................ | 710/38 |
| 6,298,388 | B1 | * | 10/2001 | Taguchi ........................ | 710/12 |
| 6,321,349 | B1 | * | 11/2001 | Hennessy .................... | 714/39 |
| 6,341,322 | B1 | * | 1/2002 | Liu et al. ....................... | 714/38 |
| 6,526,525 | B1 | * | 2/2003 | Chang ........................ | 714/40 |

FOREIGN PATENT DOCUMENTS

NL        9301257 A  *  2/1995  ........... G09F/13/02

* cited by examiner

Primary Examiner—Nadeem Iqbal
Assistant Examiner—Emerson Puente
(74) Attorney, Agent, or Firm—Joseph P. Lally; Mark E. McBurney

(57) ABSTRACT

A debug card suitable for use with a data processing system is disclosed. The card includes a microcontroller, a storage device connected to the microcontroller; and, connected to the microcontroller, means for tapping into a communication bus of the data processing system where the bus communicates information between a processor of the data processing system and a display panel. The microcontroller is configured to record the information received by the display panel from the processor in the storage device when the debug card is connected to the communication bus. In one embodiment, the communication bus and the microcontroller are I$^2$C compliant. In this embodiment, the debug card may have its own I$^2$C address thereby enabling the debug card to communicate with the processor. The debug card may further include a serial port connected to the microcontroller. The serial port enables downloading the information stored in the storage device to an external computer. In addition, a user of the external computer may send commands to the data processing system through the serial port to customize the debug session. The debug card may further include a non-volatile storage device containing software enabling the microcontroller to communicate information to the processor. The means for tapping into the communication bus may include a tee connector having a debug port and a communication bus port. In this embodiment, a communication bus ribbon cable is connected to the communication bus port and a debug cable is connected to the debug port. At least a portion of the signals of the communication bus are routed to the debug card via the tee connector and the debug cable. The debug card may include a battery connected to the storage device and suitable for retaining the information in the storage device when external power to the debug card is disconnected.

17 Claims, 3 Drawing Sheets

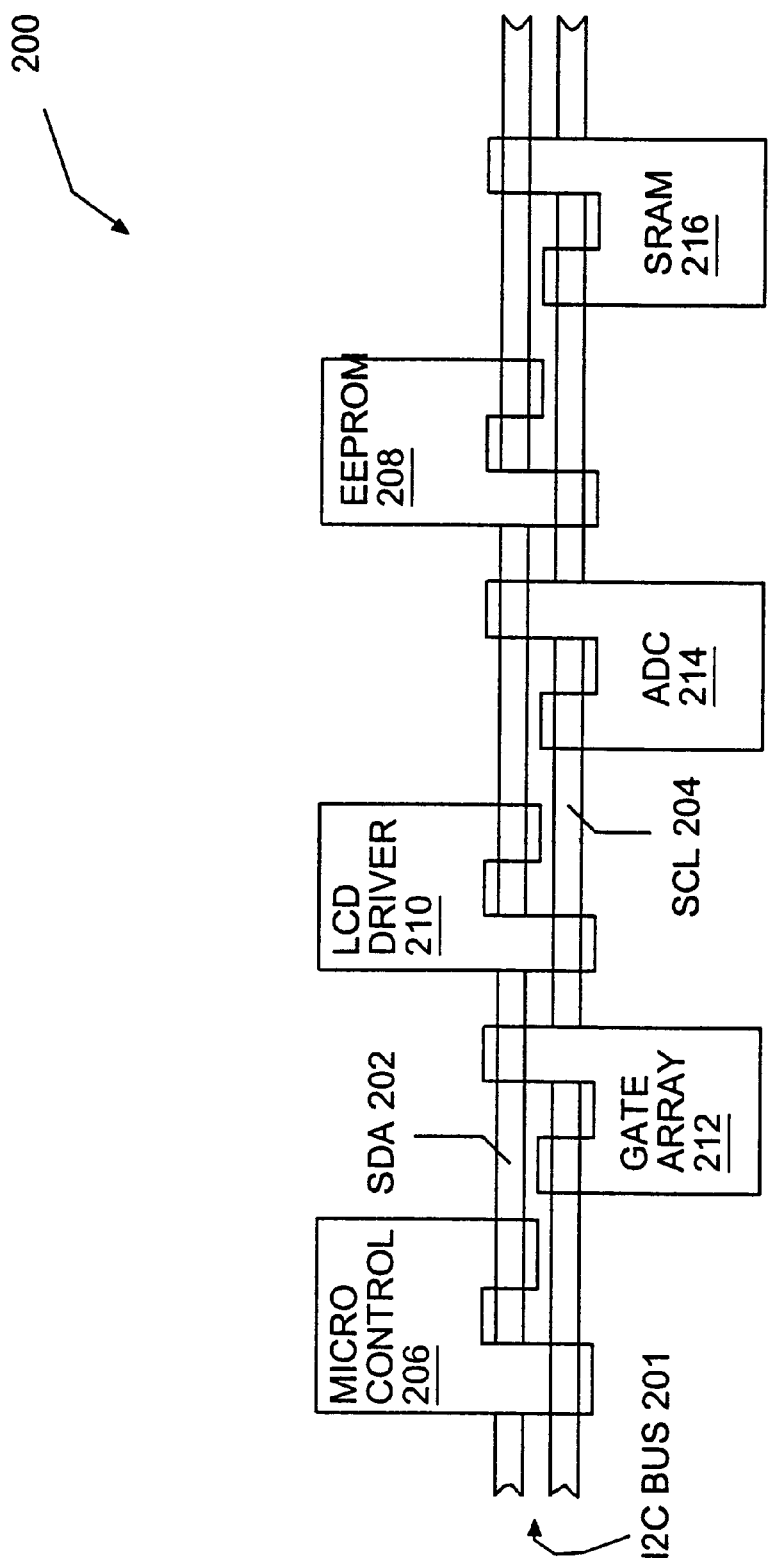

EXTERNAL DEBUG CARD SHARING A COMMUNICATION BUS

BACKGROUND

1. Field of the Present Invention

The present invention is generally related to the field of data processing systems and more particularly to a device that provides an external debugger for a data processing system that communicates with an I²C compliant component.

2. History of the Related Art

Software and firmware written for computer systems require testing and debugging during the development phase to identify and remove code defects. Sometimes a code defect escapes detection and propagates to the field. These defects are typically not detected during development because they are intermittent in nature or are only triggered by unusual events. Debugging facilities are, therefore, important resources when a defect appears in the field. A typical debug tool communicates with the system through a debug port. The debug port enables programs to display progress messages from various points in the program flow. The port's functionality may include the ability to capture, timestamp, and save progress messages, but also important transient information that is written to it at critical points in the program. This feature is commonly described as a "trace" or "logging" feature. Unfortunately the debug port is typically implemented as a standardized serial port such as an RS232 port. In one implementation, a dedicated debug serial port that is otherwise unavailable to the user (i.e., is not supported by the operating system) is provided. In another, more common implementation, one of the operating system supported ports is used for debugging purposes. The former implementation results in additional cost for a dedicated debug port that might receive little if any use. The latter implementation may be problematic if the customer has utilized each available port for his or her own (non-debugging) purposes leaving no port available for debug purposes. In this situation, debugging would require removal of one of the customer's peripheral device. In a worst case scenario, a device that is responsible for the bug or defect is the device that is swapped out when the debug facility is attached, thereby making it impossible to detect or analyze the problem. To avoid either of these undesirable situations, it would be highly desirable to implement a solution by which a debugging facility could be integrated with a data processing system without requiring a dedicated port and without consuming a port that would otherwise be available to the customer.

SUMMARY OF THE INVENTION

The problem identified above is addressed in large part by a debug card suitable for use with a data processing system. The card includes a microcontroller, a storage device connected to the microcontroller and, connected to the microcontroller, means for tapping into a communication bus of the data processing system where the communication bus communicates information between a processor of the data processing system and a display panel. The microcontroller is configured to record the information received by the display panel from the processor in the storage device when the debug card is connected to the communication bus. In one embodiment, the communication bus and the microcontroller are I²C compliant. In this embodiment, the debug card may have its own I²C address thereby enabling the debug card to communicate with the processor. The debug card may further include a serial port connected to the microcontroller. The serial port enables downloading the information stored in the storage device to an external computer. In addition, a user of the external computer may send commands to the data processing system through the serial port to customize the debug session. The debug card may further include a non-volatile storage device containing software enabling the microcontroller to communicate information to the processor. The means for tapping into the communication bus may include a tee connector having a debug port and a communication bus port. In this embodiment, a communication bus ribbon cable is connected to the communication bus port and a debug cable is connected to the debug port. At least a portion of the signals of the communication bus are routed to the debug card via the tee connector and the debug cable. The debug card may include a battery connected to the storage device and suitable for retaining the information in the storage device when external power to the debug card is disconnected.

BRIEF DESCRIPTION OF THE DRAWINGS

Other objects and advantages of the invention will become apparent upon reading the following detailed description and upon reference to the accompanying drawings in which:

FIG. 2 is a diagram of an I²C system and bus suitable for use with the present invention.

Figure 1A:
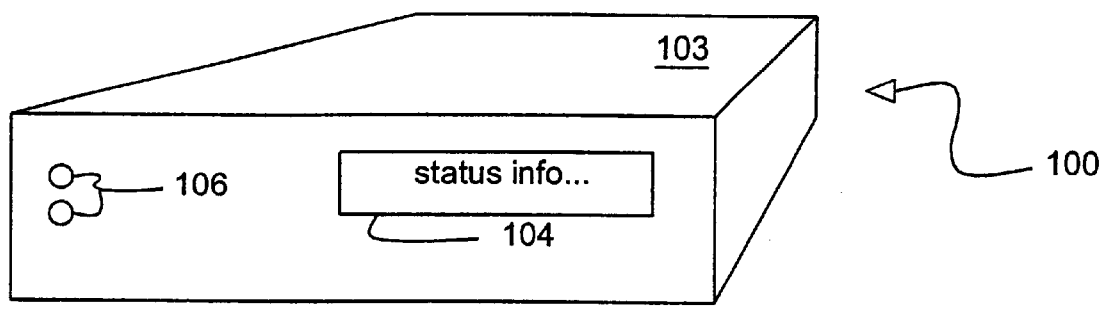
FIG. 1A illustrates a data processing system including an display panel.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Generally speaking, the invention contemplates connecting a debug card to a data processing system such as a computer server. The debug card is connected to means for tapping into an existing communication bus of the data processing system to create an externally supplied debug facility. In this manner, the debug card does not require a dedicated debug port and does not consume a general purpose port of the data processing system.

In one embodiment, the debug card is connected to an Inter IC (I²C) compliant bus of the data processing system. The I²C bus is a simple, two line bus for interconnecting a variety of devices. For detailed information regarding the I²C bus, the reader is referred to the I²C *Bus Specification, Version* 2.0, December 1998 form Philips Semiconductors B.V. (www.semiconductors.philips.com) P.O. Box 218, 5600 Md. Eindhoven, The Netherlands, and to Paret et al., The I²C *Bus From Theory To Practice* (John Wiley & Son Ltd. 1997), ISBN No. 0471962686, both incorporated by referee herein. Computers servers and other data processing systems may include such a bus to communicate information such as boot progress information to a low level display panel ("op panel"). Thus, before the operating system is up and running following a power on, system reset, or other boot event, the I²C compliant display device is useful for indicating system status and other information.

Figure 1B:
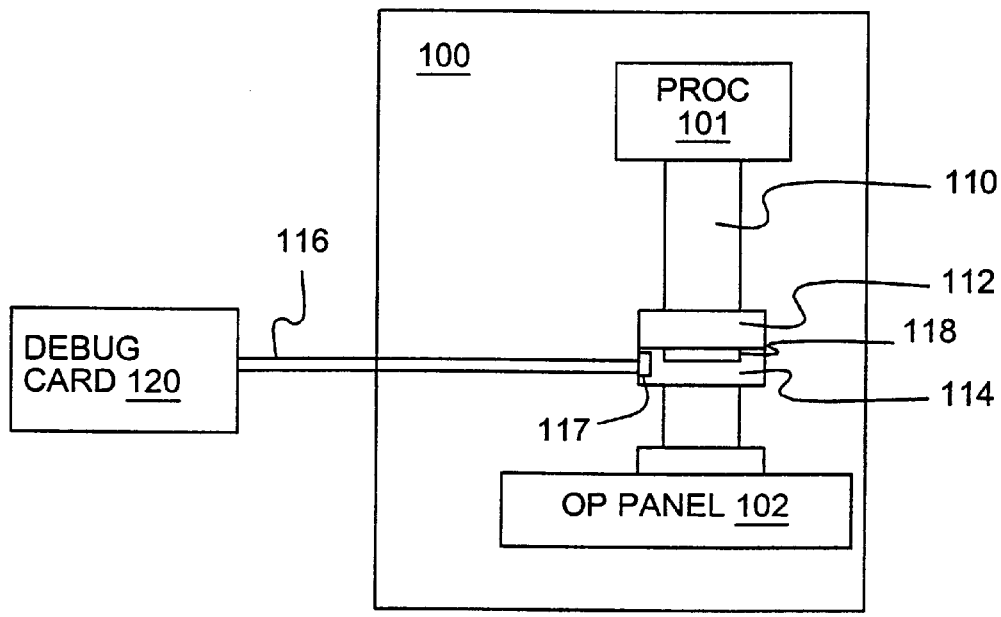
FIG. 1B is a block diagram of the data processing system of FIG. 1 connected to a debug card according to the present invention.

Turning to the drawings, FIGS. 1A and 1B depict a data processing system 100 and an associated device (debug card) 120 according to one embodiment of the invention. In the depicted embodiment, data processing system 100 is a microprocessor based computer such as a server, a desktop type PC, a network computer, or other suitable computing device. Data processing system 100 includes one or more processors, one of which is indicated in FIG. 1B by reference numeral 101. Processor 101 may be implemented with any of a variety of commercially distributed general purpose microprocessors including RISC processors such as the PowerPC® family of processors from IBM Corporation and x86 compatible processors such as the Pentium® family of processors from Intel Corporation. In another embodiment, processor 101 may represent the system's service processor that is designed to manage low level hardware tasks including configuration tasks as well as environmental and mechanical control tasks.

A chassis 103 of system 100 includes various cut-outs that enable access to various components including one or more buttons 106 such as power buttons and reset buttons. A display panel (also referred to as an op panel) 104 is located on chassis 103 and is connected to processor 101 via a communication bus to enable processor 101 to communicate information to the user, especially during a boot sequence or at any other time when the system's video display is not enabled. In the depicted embodiment, a communication bus ribbon cable 110 carries signals between processor 101 and op panel 102. In one embodiment, op panel 102 is an I²C compliant device that communicates with processor 101 via an I²C compliant communication bus whose signals are carried by ribbon cable 110. Ribbon cable 110 may carry other signals that are delivered to other components such as the power and reset buttons 106 on chassis 103.

The present invention contemplates tapping into the communication bus that drives op panel 102 to provide a means of logging the information that is communicated to op panel 102 and to enable an interactive debug session. To accomplish these goals, the I²C bus signals of ribbon cable 110 are routed via debug ribbon cable 116 to a debug card 120. In one embodiment, a dual port tee connector 114 is connected to connector 112 of ribbon cable 110 to "tee" off selected signals (the I²C signals) from ribbon cable 110. In the depicted embodiment the debug ribbon cable 116 is connected to a debug port 117 of tee connector 114 while the communication bus ribbon cable 110 is connected (via connector 112) to a bus port 118 of tee connector 114. The signals that are teed off by tee connector 114 are passed through to their original destination (op panel 102) and routed to a second device (debug card 120) that is connected to tee connector 114 via ribbon cable 116. Thus, in the depicted embodiment, the I²C signals in ribbon cable 110 are passed through to op panel 102 and routed to debug card 120 by tee connector 114 via ribbon able 116.

Turning now to FIG. 2, an I²C compatible system 200 that may form a portion of data processing system 100 is depicted. Information transfer in system 200 occurs over an I²C bus 201. I²C bus 201 includes an SDA line 202 and an SCL line 204. The depicted embodiment, system 200 may include a microcontroller 206 and an I²C compatible EEPROM 208. The depicted embodiment of system 200 in FIG. 1 further includes various additional components such as an LCD driver 210 capable of driving op panel 102, a gate array 212, an analog to digital converter (ADC) 214, and an SRAM 216. It will be appreciated that the components of system 200 depicted in FIG. 1 are merely representative of the type of components that may be connected in an I²C system. A wide variety of other configurations and devices are possible. The invention as described herein is most concerned with the I²C compatible LCD driver 210 and microcontroller 206.

Figure 3:
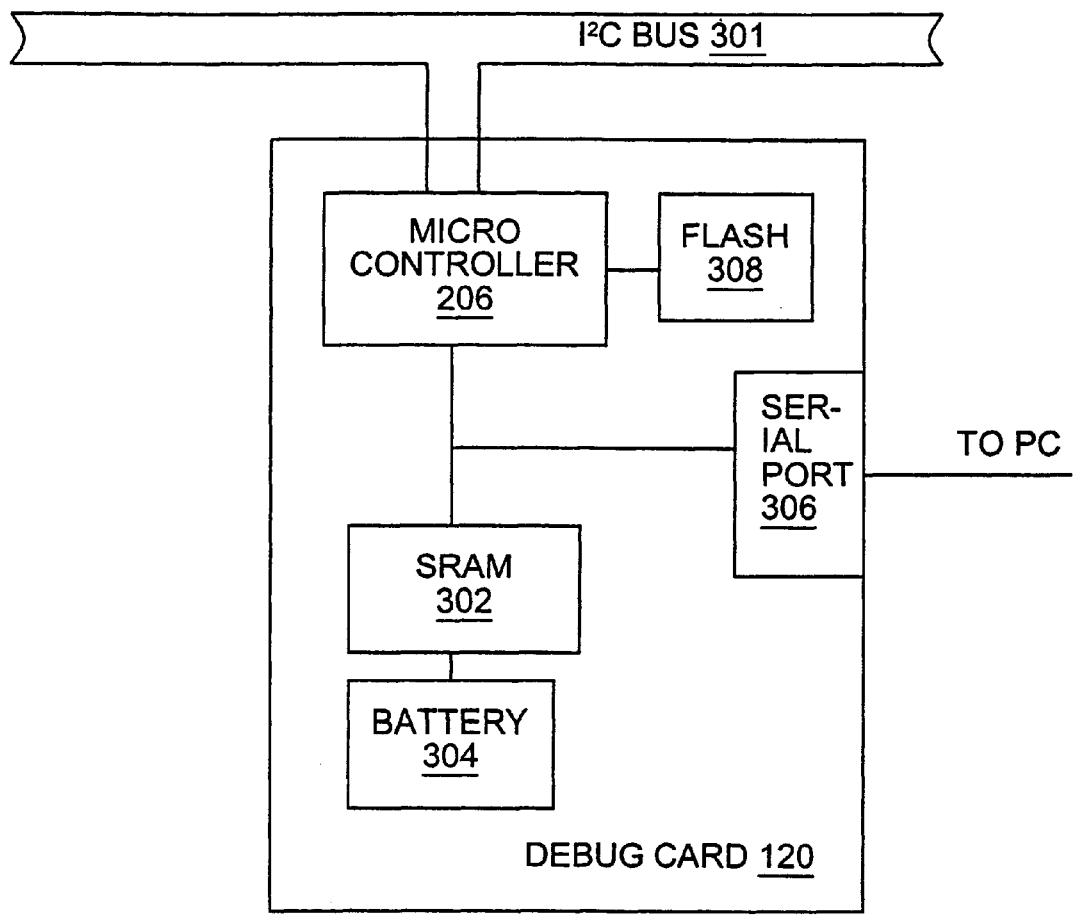
FIG. 3 is a block diagram illustrating various components of the debug card of FIG. 1B according to one embodiment of the invention.

Referring now to FIG. 3, the depicted embodiment of debug card 120 includes an I²C compliant microcontroller 206 that is connected to an I²C bus 301 carried by ribbon cable 116 (shown in FIG. 1B). In addition, debug card 120 typically includes a random access memory element such as the SRAM 302 depicted. Because I²C bus traffic is visible to all devices connected to the bus, debug card 120 may operate as a listening device that simply logs all traffic on the I²C bus 301. This embodiment might be suitable in an implementation in which the LCD driver 210 of op panel 102 is the only other device on I²C bus 301. If multiple devices are connected to I²C bus 302 and the user of debug card 120 is primarily concerned with the information that is passed to op panel 102, microcontroller 206 may be programmed to log information that is specific to one or more I²C device addresses.

The depicted embodiment of debug card 120 further includes a battery 304 that is connected to SRAM 302 and provides a means for retaining the contents of SRAM 302 when the debug card 120 is disconnected from I²C bus 301. In this embodiment the user might log the information that is sent to op panel 102 over an extended period of time. After sufficient information has been gathered the user may disconnect debug card 120 from I²C bus 301 and port the card to a conventional desktop, laptop, server or network machine for down loading. In one embodiment, debug card 120 includes a communication port 306 that enables external communication with a desktop or other similar machine. The port 306 may comprises a serial port that is compatible with an industry accepted serial bus protocol such as the IEEE RS232 protocol.

In addition to enabling downloading of information that is logged onto SRAM 302, serial port 306 enables a user to connect a laptop or other suitable computer to debug card 120 when debug card 120 is connected to system 100. If the microcontroller 206 has its own I²C address, the user can initiate and maintain an interactive debug session by communicating with processor 101 via I²C bus 301. Debug card 120 may contain a non-volatile storage device such as flash memory device 308 that includes software in the form of a set of instructions executable by microcontroller 206 that enable the debug card to transfer information to the processor 101. A user may, for example, establish an interactive debug session with processor 101. In one embodiment, the user may be able to sequence through the boot process of system 100 on a step-by-step basis by issuing an appropriate instruction to the debug card. In addition, the debug card may be enabled to interpret information that is sent to op panel 102 by processor 101 and present the information to the user in a more user friendly manner.

If the boot sequence program is aware of the presence of debug card 120, the boot sequence may incorporate direct communication with the debug card to provide it with information not suitable for display by op pane 102. If the boot sequence includes such commands and the debug card 120 is not connected to system 100 when the boot sequence is initiated, the absence of the debug card will merely result in the generation of a NOACK on I²C bus 301.

It will be appreciated by those skilled in the art having the benefit of this disclosure that the present invention contemplates providing an external debug facility for a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A debug card suitable for use with a data processing system that includes a processor and a display panel that receives information from the processor via a communication bus, the debug card comprising:

a microcontroller;

a storage device connected to the microcontroller;

connected to the microcontroller, a tee connector including a debug port and a communication bus port, wherein a communication bus connecting the processor and the display panel is also connected to the communication bus port, a debug bus connected to the debug card is also connected to the debug port, wherein at least a portion of the signals of the communication bus are routed to the debug bus; and wherein the microcontroller is configured to record the information received by the display panel from the processor in the storage device when the debug card is connected to the communication bus.

2. The debug card of claim 1, wherein the communication bus and the microcontroller are I²C compliant.

3. The debug card of claim 1, further comprising a serial port connected to the microcontroller and configured to enable transfer of the information stored in the storage device to an external computer.

4. The debug card of claim 1, wherein the debug card further includes a non-volatile storage device containing a set of microcontroller executable instructions for communicating information from the debug card to the processor via the communication bus.

5. The debug card of claim 4, wherein the communication bus and the microcontroller are I²C compliant and wherein the debug card recognizes and responds to a specified I²C address.

6. The debug card of claim 4, wherein the debug card further includes a serial port connected to the microcontroller and configured to enable an external computer connected to the debug card via the serial port to provide the information sent from the debug card to the processor.

7. The debug card of claim 1, wherein the communication bus and the debug bus each comprise a ribbon cable.

8. The debug card of claim 1, further comprising a battery connected to the storage device and suitable for retaining the information in the storage device when external power to the debug card is disconnected.

9. A method of debugging a data processing system, comprising:

tapping into a communication bus that connects a processor of the data processing system to a display panel by connecting a debug ribbon cable between an external debug card and a debug port of a tee connector wherein the tee connector includes a bus port that receives the communication bus;

transferring information between the processor and the display panel; and recording, via the tap, information transmitted between the processor and the display panel in a storage device of the debug card.

10. The method of claim 9, wherein the communication bus comprises an I²C compliant bus.

11. The method of claim 9, wherein storing the information comprises storing the information in an SRAM of the external debug card that is connected to the microcontroller.

12. The method of claim 9, further comprising, retrieving the stored information from the storage device and sending the stored information to an external computer via a serial port of the external debug card.

13. The method of claim 9, further comprising, sending information from the debug card to the processor.

14. The method of claim 13, further comprising controlling the information sent from the debug card to the processor via an external computer connected to the debug card through a serial port.

15. A debug device for use with a data processing system comprising:

a microcontroller;

a storage device connected to the microcontroller;

means for receiving op panel information transmitted over an I²C bus connecting a service processor of the data processing system and an op panel of the data processing system; and means for taping into the I²C bus;

wherein the debug device is configured, when tapped into the bus, to record boot progress information transmitted to the op panel from the processor during a system boot.

16. The debug device of claim 15, further comprising a serial port enabling the debug device to connect to an external system to permit communication between the external system and the data processing system during boot sequencing of the data processing system.

17. The debug device of claim 16, wherein the means for tapping includes a tee connector that connects at least a portion of the signals in the communication bus to the debug device and further wherein the data processing system bus comprises a first ribbon cable and the tee connector is connected to the debug device via a second ribbon cable wherein the tee connector tees off at least a portion of a the first ribbon cable to the second ribbon cable.

* * * * *

UNITED STATES PATENT AND TRADEMARK OFFICE
CERTIFICATE OF CORRECTION

PATENT NO. : 6,715,110 B1
DATED : March 30, 2004
INVENTOR(S) : William Eldred Beebe, Robert Allan Faust and Joel Gerald Goodwin It is certified that error appears in the above-identified patent and that said Letters Patent is hereby corrected as shown below:

Column 6,
Line 31, should read:

15. A debug device for use with a data processing system comprising:
    a microcontroller;

a storage device connected to the microcontroller;

means for receiving op panel information transmitted over an $I^2C$ bus connecting a service processor of the data processing system and an op panel of the data processing system; and means for tapping into the $I^2C$ bus;

wherein the debug device is configured, when tapped into the bus, to record boot progress information transmitted to the op panel from the processor during a system boot.

Signed and Sealed this

Twelfth Day of October, 2004

JON W. DUDAS
*Director of the United States Patent and Trademark Office*